A. V. ROE.
LANDING DEVICE FOR AIRCRAFT.
APPLICATION FILED MAR. 22, 1918.
1,362,511. Patented Dec. 14, 1920.
3 SHEETS—SHEET 1.
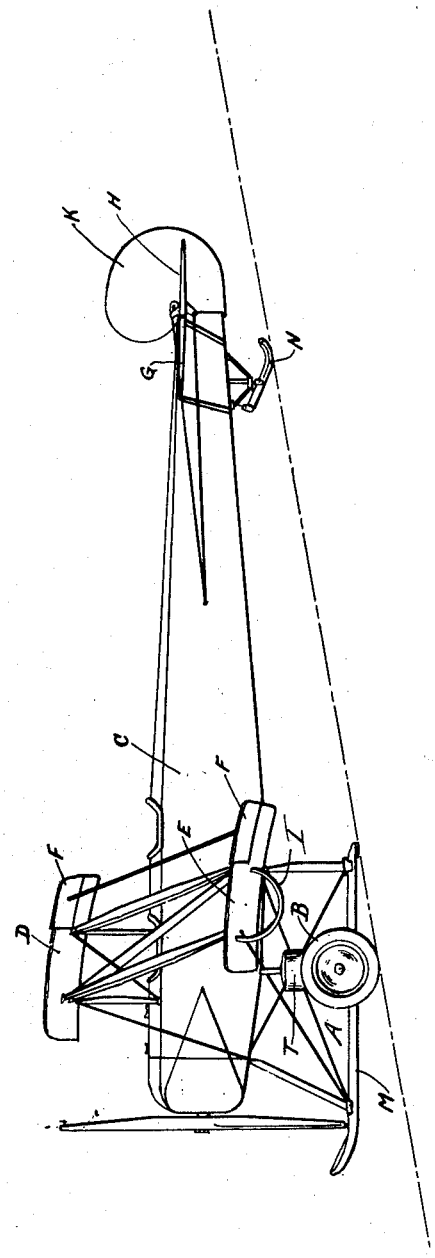
INVENTOR
Alliott V. Roe
BY
Wm. Henry
ATTORNEY

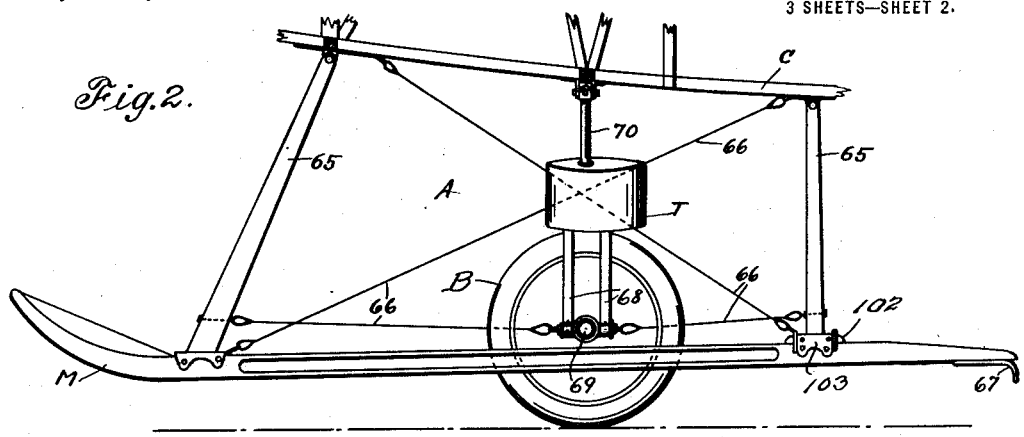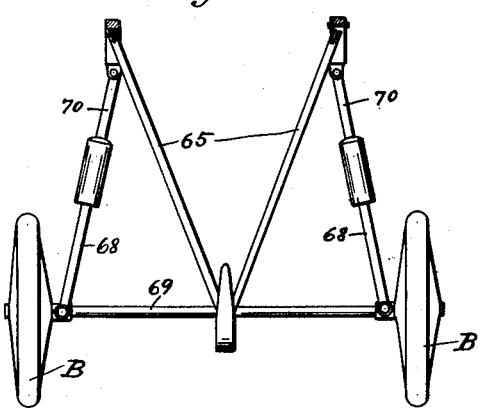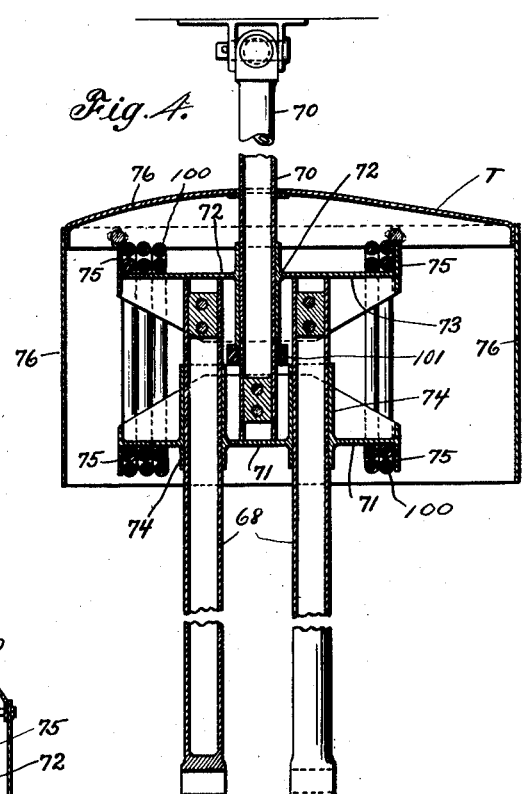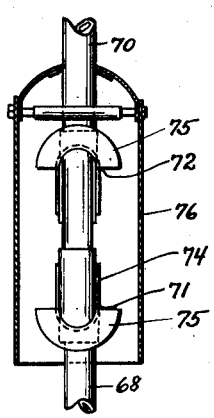

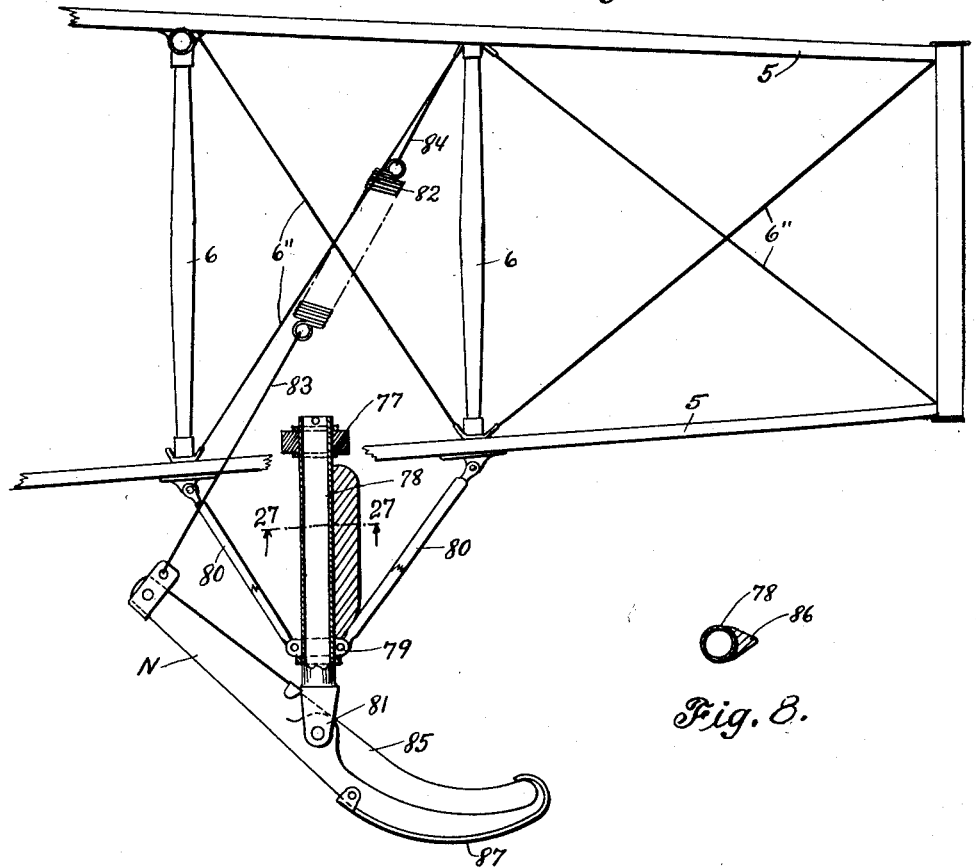
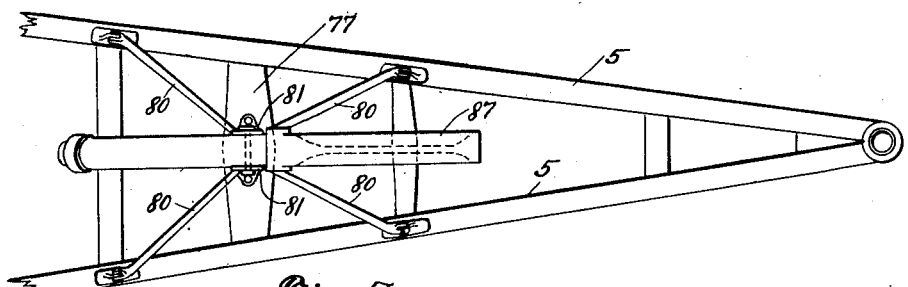

UNITED STATES PATENT OFFICE.

ALLIOTT VERDON ROE, OF HAMBLE, SOUTHAMPTON, ENGLAND, ASSIGNOR TO A. V. ROE & CO., LIMITED, OF MANCHESTER, ENGLAND.

LANDING DEVICE FOR AIRCRAFT.

1,362,511. Specification of Letters Patent. Patented Dec. 14, 1920.

Application filed March 22, 1918. Serial No. 224,085.

*To all whom it may concern:*

Be it known that I, ALLIOTT VERDON ROE, a subject of the King of Great Britain, residing at Hamble, Southampton, England, have invented certain new and useful Improvements in Landing Devices for Aircraft, of which the following is a specification.

The invention relates to landing devices capable of use for aircraft generally, but has particular application to aeroplanes.

The objects of the invention are, firstly to enable aeroplanes to be landed without damage either to their front or rear ends, secondly to avoid the tractor air-screw striking the ground during landing, and thirdly to provide that the aircraft may land not only on an even keel but also at various other angles.

In the accompanying drawings the invention is shown as applied to an aeroplane, the novel features of the invention being set out hereinafter in the claims.

In the accompanying drawings Figure 1 is a view showing an aeroplane in side elevation embodying this invention; Fig. 2 is a detail view of the front landing gear shown in Fig. 1; Fig. 3 is a front elevation of the landing gear shown in Fig. 2; Fig. 4 is an enlarged, vertical, sectional view of the shock absorber shown in Fig. 2; Fig. 5 is a view showing in side elevation the shock absorber shown in Figs. 2, 3 and 4; Fig 6 is an enlarged, detail view, partly in section, showing the rear end construction of the fuselage and the manner of supporting the rear skid; Fig. 7 is a bottom plan view of the construction shown in Fig. 6; and Fig. 8 is a transverse, sectional view taken on the line 27, 27 of Fig. 6 and looking in the direction of the arrows.

Referring to the drawings in detail, particularly to Fig. 1, I have here shown an aeroplane of the biplane type, which comprises a landing carriage A mounted on wheels B and associated with the front skid M supporting a fuselage C, the said fuselage being also provided at its rear end with a tail skid N for the purpose of supporting the tail when landing, or on the ground. The aeroplane shown has the usual features common to a biplane of this type, viz., an upper main plane D and a lower main plane E. The tail of the fuselage is formed with fixed horizontal planes such as G with elevating planes H hingedly connected to the rear or trailing edge thereof, and having a rudder K pivotally supported between the elevating planes H.

The biplane herein shown is of the tractor type, and is provided with a usual tractor airscrew L at the forward end of the fuselage C. Disposed directly below the axis of the airscrew L and associated with the landing carriage A is a longitudinally disposed front or main skid M projecting forward of the landing carriage beneath and centrally of the airscrew L so that it interposes itself between the said airscrew and the ground when landing and prevents the said airscrew from hitting the ground if landing at a steep incline.

As shown in Figs. 2 and 3 a mounting for the front skid M is provided attached to the longerons of the fuselage C by means of the upstanding struts 65 with their upper ends pinned to the fuselage framework. The forward struts 65 are longer than the rear struts and are forwardly inclined from the fuselage toward the skid M, in order to aline more nearly with the direction in which the landing shock would usually meet the skid. The forward end of the skid is curved upwardly in the form of an arc, and, as clearly shown in Fig. 1, is arranged in overlapped relation to the airscrew L in order to protect the latter as previously mentioned, the skid being disposed centrally of the fuselage C and directly below the axis of the airscrew L so that when the engine is cut off, prior to landing, it is immediately beneath the airscrew should it assume approximately a vertical position. Should the first contact of the aeroplane with the land take place on the carriage wheels B, and they come into play, the downwardly curved plate 67 at the rear end of the skid will engage the earth when the aeroplane is landing, thus providing breaking means for the machine. A resilient or shock absorbing pad 102 is inserted between the bearing plate 103 of the struts 65, and the skid for the purpose of absorbing the shock of landing thereon.

Referring now to Figs. 2 to 5 inclusive, T designates generally a shock absorber, which, as clearly shown in Fig. 4, comprises means by which the carriage axle 69 provided with the wheels B reduces the shock of landing. This means comprises a lower pair of tubular struts 68 having their lower ends pivotally connected to the carriage axle 69. An upper strut 70 has its upper end universally jointed to the fuselage C, while its lower end is interposed between the lower struts and in overlapped relation thereto. Secured to the upper end of the struts 68 is a bridge plate 73 formed with a central tube 72 in which is slidably mounted the upper strut 70. The lower end of the upper strut is also formed with a bridge plate 71, and formed integral with this plate are parallel tubes 74 slidably receiving the lower struts 68. The plates 73 and 71 as shown in Fig. 5 are of semi-circular formation and are provided with flanges 75. Wound around the plates 73 and 71 are a number of convolutions of elastic cord 100 which serve to bias the bridge plates toward each other, and consequently to bias the lower and upper struts downwardly and upwardly respectively so that they yieldingly oppose any shocks to which the carriage is subjected. Mounted upon the upper strut 70 is a casing 76 for the shock absorber, and this casing has its lower end open to permit ready access to and free movement of the shock absorber, while effectively protecting the same from the elements. This casing is of streamline form in order to reduce the air resistance of the device. It will be noted that by virtue of the manner in which the struts are interconnected any lateral movement thereof with respect to each other is prevented, although their longitudinal movement is at all times free and unrestricted excepting by the force exerted by the rubber cord aforesaid. 101 indicates a pad of rubber or similar material upon which the members come to rest in the position of minimum extension of the rubber cord 100.

As shown in Fig. 3, the carriage A is provided with two of these shock absorbers and their connections arranged in divergent relation with respect to the chassis for the purpose of effectively and yieldingly supporting the carriage upon the axle 69, with a sufficiently wide wheel base.

It should be noted that the only connection between the supports of the landing wheels B and the supports of the skid M is by means of the approximately horizontal tensioning wires 66 connecting the slanting struts 65 at each end of the skid with the ends of the axle 69 respectively, and the purpose of this arrangement is that the shock of landing shall be taken by the resiliently supported wheels B and if that is not sufficient in itself, or if the ground should not happen to be sufficiently level for bearing the wheels, then the skid gear is provided to prevent the fuselage and more especially the airscrew striking the ground without the interposition of any landing gear.

By reason of the universal connection between the upper struts 70 and the fuselage, said struts are capable not only of angular movement in a lateral direction to compensate the vertical movements of the axle 69, but also of angular movement in a longitudinal or fore-and-aft direction with respect to the body, whereby slight arcuate movement of the whole axle is permitted. Such arcuate movement, is of course, resisted by the tensioning wires 66, but in the rear pair of wires are inserted strong buffers packed with rubber or other shock absorbing material adapted to mitigate shock applied to the axle 69 in a fore-and-aft direction.

Referring to Figs. 6 and 7, I have here shown one means for yieldingly and movably supporting the rear skid N, such means comprising the cross bearing plate 77 in which is journaled the upper end of a vertically disposed tubular shaft 78, the lower end of the latter being journaled in a collar 79 supported in depending relation to the fuselage C by means of stay rods 80. The lower end of the shaft 78 is formed with spaced ears 81 between which is pivoted the rear skid N, the pivoting of the skid being in itself a known method which has previously been proposed. The skid N is biased to the position shown in Fig. 6 by means of a coiled contractile spring 82 connected to the upper end of the skid by a wire 83 and to the fuselage frame by a wire 84.

By means of this mounting the skid N is free to swing laterally, to assume any position within the radius of a semi-circle, and effectively to support the rear end of the fuselage irrespective of the angle at which the aeroplane lands. The spring 82 serves yieldingly to support the skid N to overcome the impact to which a fuselage is ordinarily subjected on landing.

The upper side of that portion of the skid N which is disposed on its pivot is provided with fairing 85 to reduce the wind resistance; and the rear of the shaft 78 is likewise provided with a fairing 86 preferably formed of wood and shaped as shown in Fig. 8.

In this embodiment of the skid N I have shown the same provided on its underside with a shoe 87 which snugly fits the lower end portion of the skid, its rear end being curved upwardly to the upper side of the skid as shown. This shoe prevents excessive wear of the skid and at the same time reinforces it.

Referring to Fig. 1, it should be noted that plane tip skids I are provided of inverted arcuate formation, one on each wing tip extending downwardly and transversely thereof in transverse divergent relation to each other, these serving to prevent the wings striking the ground when not landing on an even keel, or when taxying on bad ground.

By the combined action of the wheels B and their supports the skid M and its supports, and the rear skid N and its supports, a most effective landing gear for aeroplane is provided, which is satisfactory under all ordinary conditions, and which will insure landing under a large variety of circumstances without harm.

Although I have herein shown and described only one form of aeroplane embodying my invention, it is understood that various changes and modifications may be made without departing from the spirit and scope of the claims hereunto appended.

What I claim as new and useful, and of my own invention, which I desire to secure by Letters Patent, is:—

1. In landing gear for aircraft, and in combination, an axle, wheels journaled on said axle, a framework, sectional members mounted by means of a universal joint on said framework and connected to said axle, means for biasing the sections of each member toward each other in the direction of their lengths, a front skid extending longitudinally of the fuselage of the aeroplane, strut supports attaching the said skid to the said aeroplane framework, and tensioning wires connecting the skid supports and the axle supports so as to secure the said skid and the said axle in predetermined relative positions.

2. In landing gear for aircraft, and in combination, an axle, wheels journaled on said axle, a framework, sectional members mounted by means of a universal joint on said framework and connected to said axle, the said members converging in a direction toward said framework, means for biasing the sections of each member toward each other in the direction of their lengths, a front skid extending longitudinally of the fuselage of the aeroplane, strut supports attaching the said skid to the said framework, tensioning wires retaining the said skid in predetermined position longitudinally, and tensioning wires connecting the skid supports and the axle supports so as to secure the said skid and the said axle in predetermined relative positions.

3. In combination, an aeroplane, comprising an airscrew located at the front thereof, an axle, wheels journaled on said axle, a framework, sectional members mounted by means of a universal joint on said framework and connected to said axle, means for biasing the sections of each member toward each other in the direction of their lengths, a skid extending longitudinally of the fuselage of the aeroplane and partly beneath its airscrew, strut supports attaching the said skid to the said framework, tensioning wires retaining the said skid in predetermined position longitudinally, and tensioning wires connecting the skid supports and the axle supports so as to secure the said skid and the said axle in predetermined relative positions.

4. In combination, an aeroplane fuselage, an axle, wheels journaled on said axle, sectional members mounted by means of a universal joint on said fuselage and connected to said axle, means for biasing the sections of each member toward each other in the direction of their lengths, a front skid extending longitudinally of the fuselage, strut supports attaching the said skid to said fuselage, tensioning wires connecting the said skid supports and the said axle supports so as to secure the said skid and the said axle in predetermined relative positions, a rear skid having a vertically disposed shaft journaled in the fuselage, a skid bar mounted on the said shaft, and means for biasing the said skid bar to a predetermined position when removed therefrom by either rotary or rocking movement.

5. In landing gear for aircraft, and in combination, a fuselage, an axle, wheels journaled on said axle, sectional members mounted by means of a universal joint on said fuselage and connected to said axle, the said members converging in a direction toward said fuselage, means for biasing the sections of each member toward each other in the direction of their lengths, a front skid extending longitudinally of the fuselage, strut supports for the said skid pin-mounted on said fuselage, tensioning wires retaining the said skid in predetermined position longitudinally, tensioning wires connecting the said skid supports and the axle supports so as to secure the said skid and the said axle in predetermined relative positions, a rear skid having a vertically disposed shaft journaled in the fuselage, a skid bar mounted on the said shaft so as to rotate or rock, and a spring connecting said fuselage and said skid bar for biasing the latter to a predetermined position.

In testimony whereof I affix my signature in the presence of two witnesses.

ALLIOTT VERDON ROE.

Witnesses:
HARVEY J. BAVERSTOCK.
CHARLES PACK.